US007216244B2

(12) United States Patent
Amano

(10) Patent No.: US 7,216,244 B2
(45) Date of Patent: May 8, 2007

(54) DATA STORAGE SYSTEM WITH REDUNDANT STORAGE MEDIA AND METHOD THEREFOR

(75) Inventor: Takashi Amano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 506 days.

(21) Appl. No.: 10/787,372

(22) Filed: Feb. 25, 2004

(65) Prior Publication Data

US 2005/0188252 A1  Aug. 25, 2005

(51) Int. Cl.
*G06F 1/32* (2006.01)
(52) U.S. Cl. .......................... 713/324; 713/320; 714/6
(58) Field of Classification Search ................ 713/320, 713/323, 324; 714/6
See application file for complete search history.

(56) References Cited

U.S. PATENT DOCUMENTS

| | | | | | |
|---|---|---|---|---|---|
| 5,088,081 | A | * | 2/1992 | Farr ......................... | 369/47.14 |
| 5,961,613 | A | * | 10/1999 | DeNicola ..................... | 710/18 |
| 6,035,379 | A | * | 3/2000 | Raju et al. .................. | 711/162 |
| 6,092,160 | A | * | 7/2000 | Marsters ...................... | 711/156 |
| 6,304,980 | B1 | * | 10/2001 | Beardsley et al. ............. | 714/6 |
| 6,748,552 | B2 | * | 6/2004 | Seguchi ......................... | 714/6 |
| 6,792,557 | B1 | * | 9/2004 | Takamoto et al. ............. | 714/7 |
| 7,035,972 | B2 | * | 4/2006 | Guha et al. .................. | 711/114 |
| 2002/0049778 | A1 | * | 4/2002 | Bell et al. .................... | 707/200 |

FOREIGN PATENT DOCUMENTS

JP    08-046685    * 2/1996
JP    2002-123406  * 4/2002

OTHER PUBLICATIONS

Patterson, David A. et al.; "A Case for Redundant Arrays of Inexpensive Disks (RAID)"; Department of Electrical Engineering and Computer Sciences, University of California, Berkeley, CA; 1988; pp. 109-116. URL: http://www-2.cs.cmu.edu/~garth/RAIDpaper/Patterson88.pdf.

(Continued)

*Primary Examiner*—Chun Cao
(74) *Attorney, Agent, or Firm*—Sughrue Mion, PLLC.; Pavel Pogodin, Esq.

(57) ABSTRACT

A data storage system includes a first data storage medium for storing data, the first data storage medium currently configured as an accessible medium; a second data storage medium for storing a copy of the data, the second data storage medium currently configured as a standby medium; first configuration information defining a switching trigger when the first data storage medium currently configured as the accessible medium becomes the standby medium and when the second data storage medium currently configured as the standby medium becomes the accessible medium; and a data storage system manager using the first configuration information to control the switching. The first data storage medium and second data storage medium may each be in a power-saving state. The accessible medium thus may be in a power-saving mode. The standby medium thus may be in a power-saving mode or in a power-off mode. The accessible medium may be read-only. The switching trigger may be a time period, an equation of access time or an administrative request. There data storage system may include additional data storage media for storing additional copies of the data, the additional data storage media also configured as standby media.

21 Claims, 6 Drawing Sheets

State Transition Diagram (default)

OTHER PUBLICATIONS

Seagate Technology; "Get S.M.A.R.T. for Reliability"; Seagate Technology Paper No. TP-67D; Seagate Product Marketing; Updated Jul. 1999; pp. 1-5. URL: http://www.seagate.com/docs/pdf/whitepaper/enhanced_smart.pdf.

Serial ATA—Enabling the Future; date unknown; 1 page. URL: http://serialata.com/.

INCITS Technical Committee T13 AT Attachment, including Membership, Committee Officers and Projects: Updated No. 6, 2003; 17 pages. URL: http://www.t13.org/.

Authored by Intel on behalf of the STA; "Serial Attached SCSI and Serial ATA Compatibility—White Paper"; Copyright 2002 Intel Corporation; pp. 1-8.

SCSI White Papers; Date Unknown; 2 pages. URL: http://www.scsita.org/about.scsi/.

Arellano, Michael and Adaptec, Inc.; "Ultra320 SCSI: New Technology—Still SCSI"; Written for the SCSI Trade Association; Copyright Mar. 2001 SCSI Trade Association; pp. 1-7. URL: http://www.scsita.org/aboutscsi/ultra320/Ultra320_WhitePaper.pdf.

\* cited by examiner

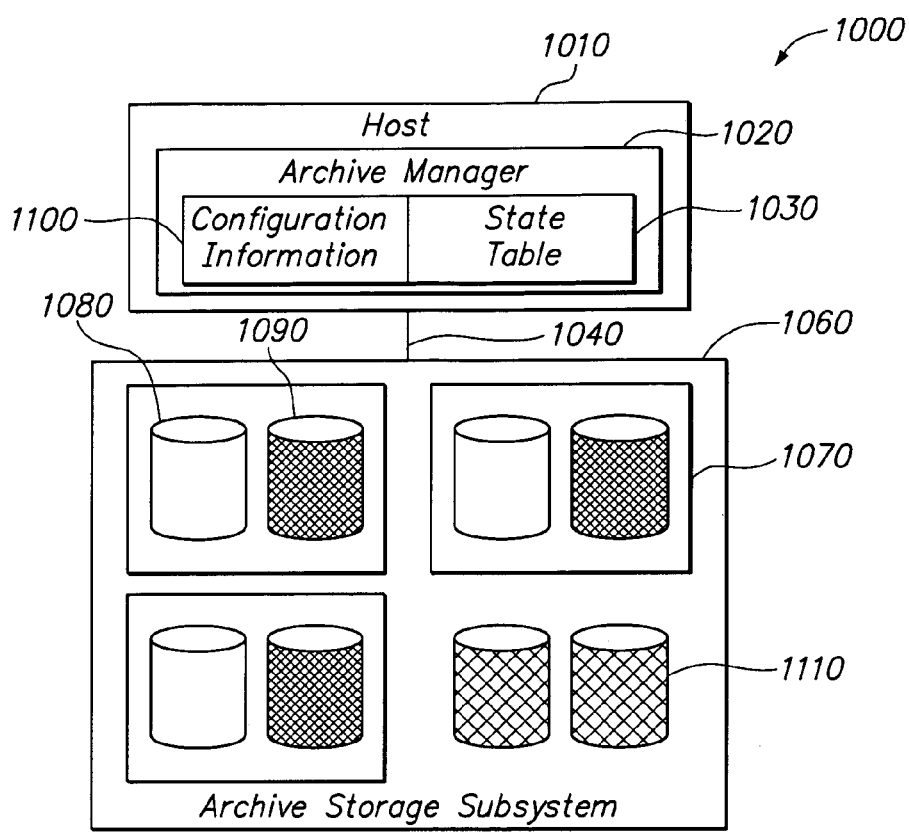
FIG. 1 Basic Configuration of a Storage System For Archive
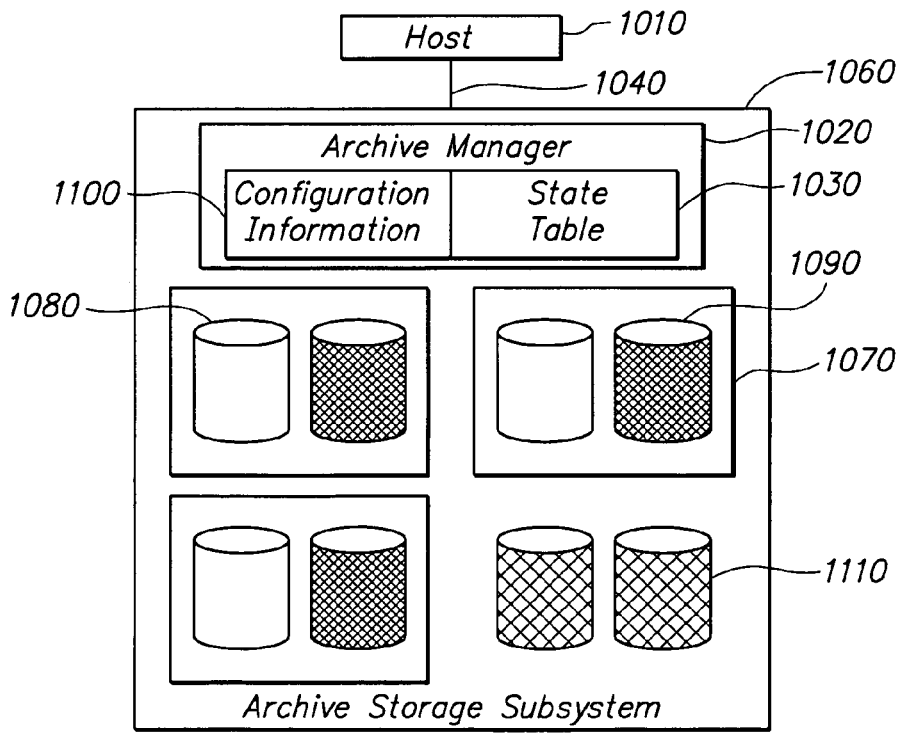
FIG. 2 The Archive Manager in the Archive Storage Subsystem

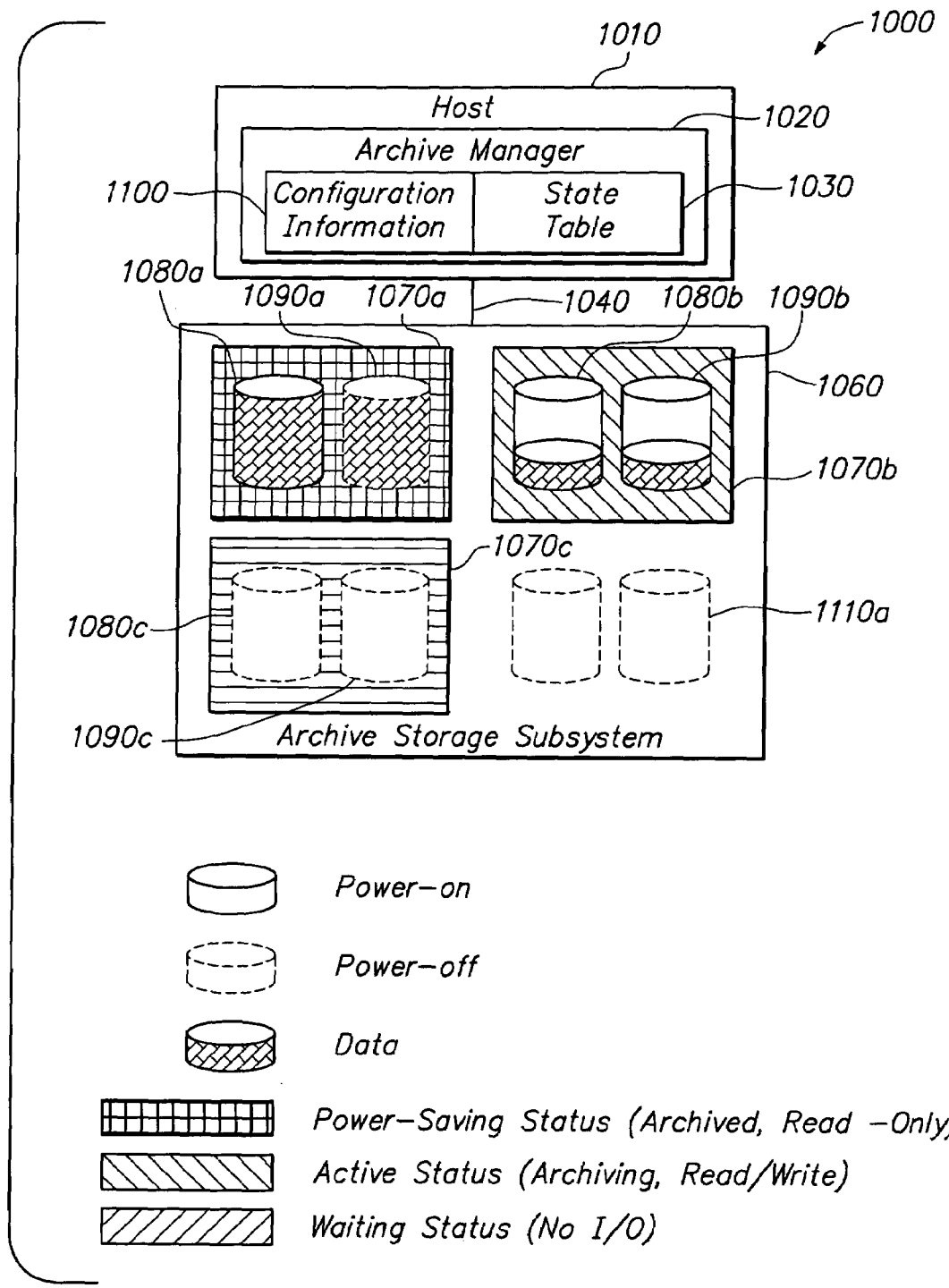
FIG. 3 Status of RAID1

| | Default | Setting Range |
|---|---|---|
| Number of Disk in RAID1 Group | 2 | Less of Equal Total of Disk |
| Number of Accessible Disk in RAID1 Group | 1 | Less or Equal Number of Disk in RAID1 Group |
| Power Status of Accessible Disk (Power Saving) | Saving Mode | ON, Saving Mode, OFF |
| Power Status of Standby Disk (Power Saving) | OFF | ON, Saving Mode, OFF |
| Power Status of Waiting Disk | OFF | ON, Saving Mode, OFF |
| Trigger of Role Reversal for Power Saving RAID1 | Time (one week) | Time (day, week, month), Equation of Access Time |
| Threshold of Maintenance Warning | 70% of total used space | Total Used Space(%), Total Used Space (Giga Bytes) |
| Number of Spare Disk | 10% of Number of Disk in Archive Storage Subsystem | Less or Equal a Half of Number of Disk in Archive Storage Subsystem |
| Time of Mode Switching | 1 Week | Hour, Day, Week, Month |
| Rewrite after read-only | No | Yes, No |

FIG. 4 Configuration Information

| | disk00 | disk01 | disk02 | disk03 | disk04 | disk05 | Total |
|---|---|---|---|---|---|---|---|
| Power Status | On | Off | On | On | Off | Off | — |
| Disk Condition | good | good | good | good | good | good | — |
| RAID1 Group# | 0000 | 0000 | 0001 | 0001 | 0002 | 0002 | — |
| Operational Mode | Power Saving | | Active | | Waiting | | 2 |
| Attributes | Read-only | | R/W | | No I/O | | |
| Used Space | 320GB | 0GB | 20GB | 300GB | 0GB | 320GB | 340GB |
| Free Space | 0GB | 320GB | 300GB | 0GB | 320GB | 0GB | 620GB |
| Total RAID1 Size | 320GB | | 320GB | | 320GB | | 960GB |

FIG. 5  State Table

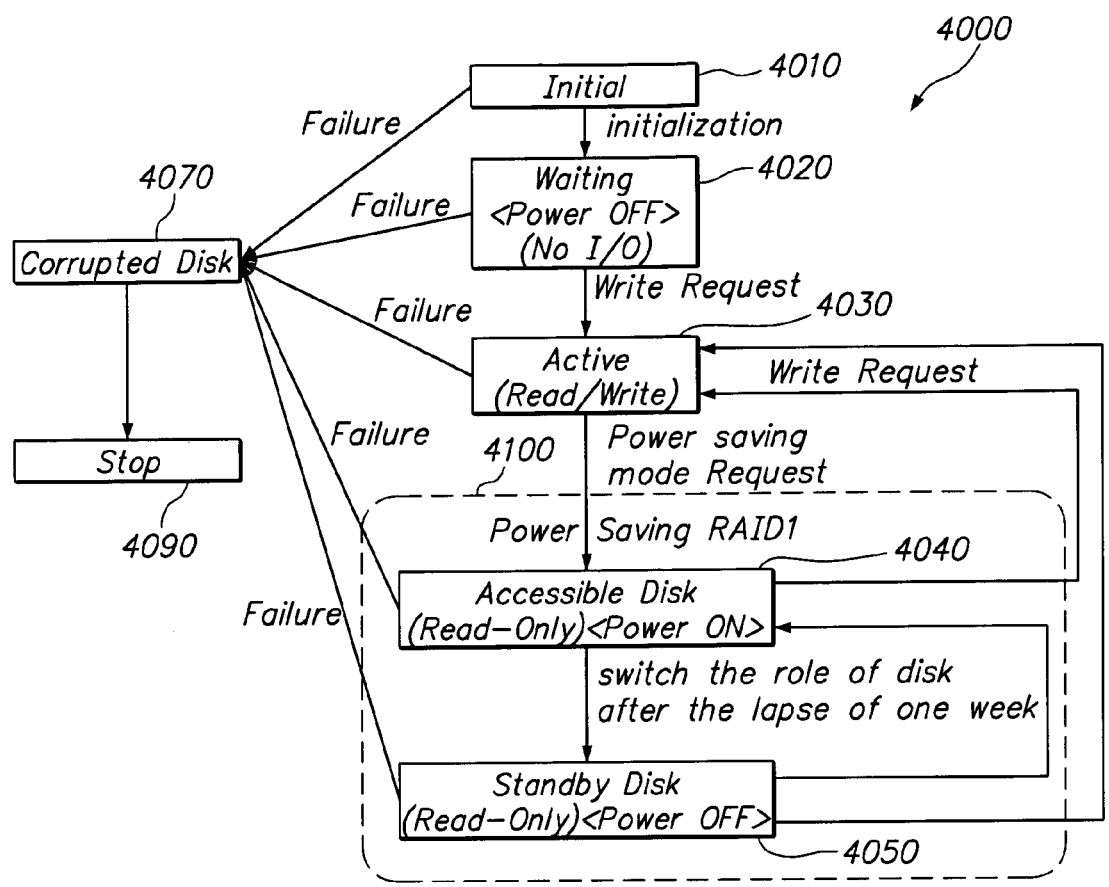
FIG. 6 State Transition Diagram (default)
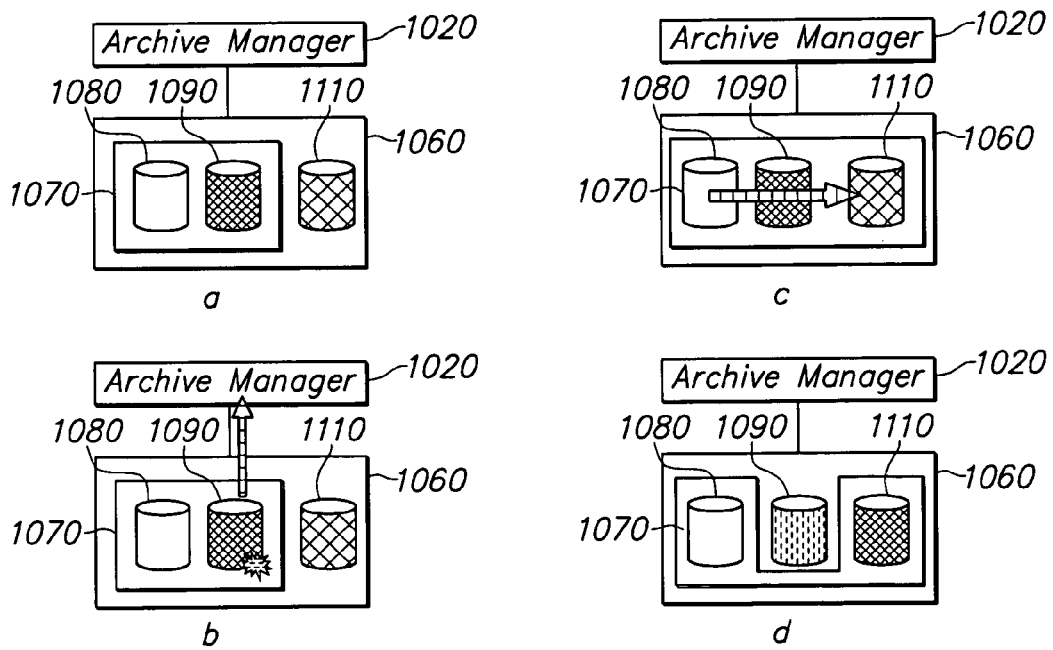
FIG. 7 Self-Repairing of RAID1 Group

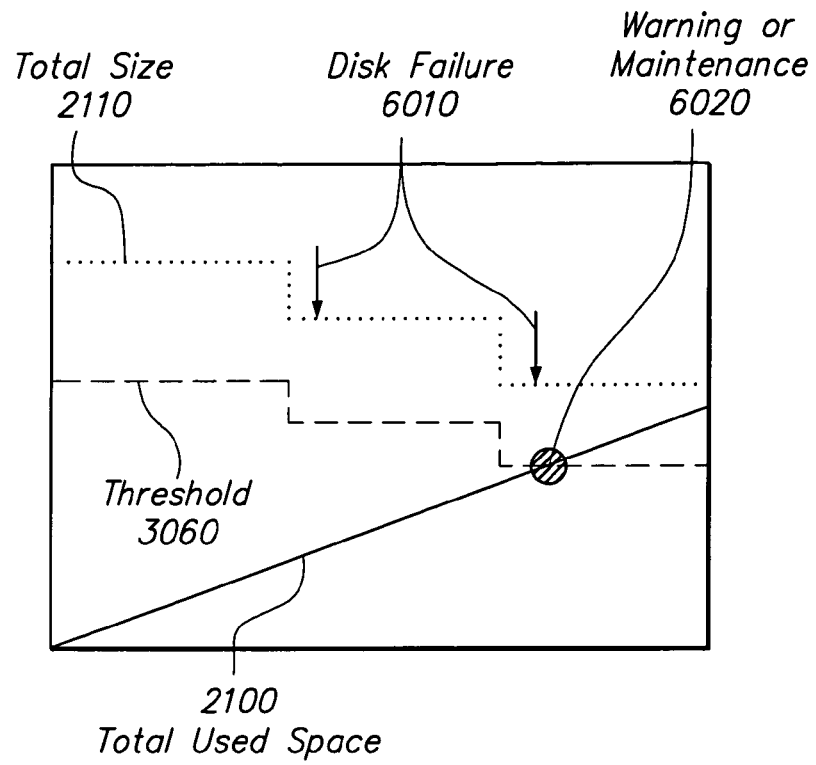
FIG. 8 Threshold Management
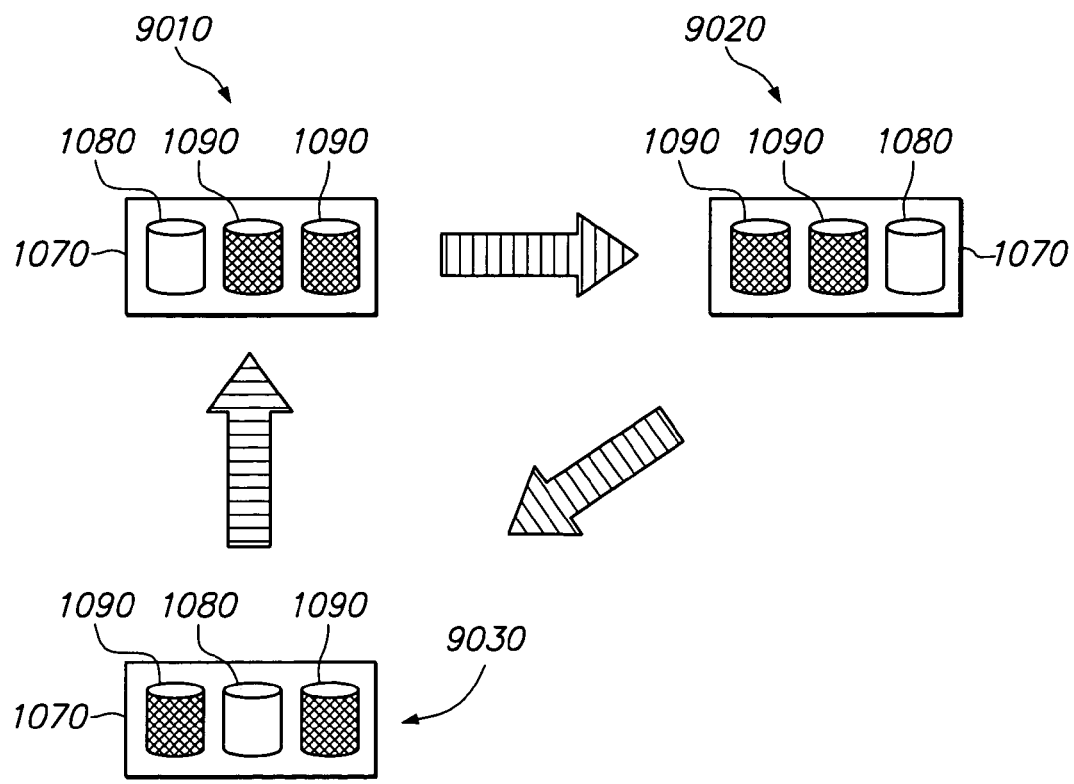
FIG. 9 Role Reversal of Disks

DATA STORAGE SYSTEM WITH REDUNDANT STORAGE MEDIA AND METHOD THEREFOR

BACKGROUND OF THE INVENTION

1. Field of the Invention

This invention relates generally to data storage, and more particularly provides a system and method for reducing power consumption, increasing reliability and/or reducing administrative overhead of data storage systems.

2. Description of the Background Art

Electronic data is stored on storage media, such as compact disks, optical disks, ATA disks and magnetic tapes. Different types of recording media differ in access speed and reliability. As always, higher quality recording media come at a price. Faster and more reliable recording media are expensive. Slower and less reliable recording media are less expensive.

For example, SCSI drives are faster and more reliable but expensive. The Ultra 320 SCSI disk drive has a speed of 320 MBytes per second. SCSI drives also include paced data transfer, a free running clock, a training pattern at the beginning of a transfer series, skew compensation, driver pre-compensation and/or optional receiver adjustable active filter (AAF). See http://www.scsita.org/aboutscsi/and http://www.scsita.org/aboutscsi/ultra320/Ultra32O_WhitePaper.pdf.

Although inexpensive, ATA drives are slower and less reliable. For example, serial ATA is a disk-interface technology developed by a group of the industry's leading vendors known as the Serial ATA Working Group to replace parallel ATA. The Serial ATA 1.0 specification, released in August 2001, indicates that serial ATA technology will deliver 150 Mbytes per second of performance. See http://www.t13.org/and http://www.serialata.com/.

To increase reliability of inexpensive systems, system designers have developed systems using what is currently termed "Redundant Arrays of Independent Disks" (RAID), e.g., RAID1. Originally, it will be appreciated that RAID stood for "Redundant Arrays of Inexpensive Disks." RAID is a form of storage array in which two or more identical data copies are maintained on separate media, typically on inexpensive magnetic disk drives. The first data storage medium acts as the primary database, responding to all user access requests. At the same time, the second data storage medium backs up the first data storage medium, so that the second data storage medium could take over all operations should the first data storage medium fail. It will be appreciated that RAID1 is also known as RAID Level 1, disk shadowing, real-time copy, and t1 copy. See http://www-2.cs.cmu.edu/~garth/RAIDpaper/Patterson88.pdf. Lower quality data storage media are less reliable and not fit for continuous operation. Mean time before failure (MTBF) is short. Accordingly, in a RAID system, it is not uncommon for drives to fail. System administrators have to watch over the systems constantly to assure proper working order of the redundant drives.

As is well known, storage media have data capacity limits. Accordingly, vast amounts of data typically must be stored on multiple disks or tapes, especially if lower quality, less expensive magnetic disks as in RAID systems are used. Since it is necessary to use many disks and tapes, power consumption is typically high.

To reduce administrative overhead and improve reliability, techniques have been developed to predict failure of disk drive systems. One such technique is termed "S.M.A.R.T." (Self-Monitoring Analysis and Reporting Technology). Namely, software on each disk drive monitors the disk drive for failure or potential failure. If a failure or potential failure is detected, the software on the disk drive raises a "red flag." A host polls the disk drives (sends a "report status" command to the disk drives) on a regular basis to check the flags. If a flag indicates failure or imminent failure, the host sends an alarm to the end-user or system administrator. This allows downtime to be scheduled by the system administrator to allow for backup of data and/or replacement of the failing drive. See http://www.seagate.com/docs/pdf/whitepaper/enhanced smart.pdf.

Current solutions to storage medium failure include automatic swap and hot standby. Automatic Swap is the substitution of a replacement unit for a defective one, where substitution is performed automatically by the system while it continues to perform normal functions (possibly at a reduced rate of performance). Automatic swaps are functional rather than physical substitutions, and thus do not require human intervention. Ultimately, however, defective components must be replaced by the system administrator (either by a cold, warm or hot swap).

Hot Standby is a redundant component in a failure tolerant storage subsystem that is powered and ready to operate, but which does not operate as long as its companion component is functioning. Hot standby components increase storage subsystem availability by allowing systems to continue to function when a component (such as a controller) fails. When the term hot standby is used to denote a disk drive, it specifically means a disk that is spinning and ready to be written to, for example, as the target of a rebuilding operation.

It will be appreciated that an archiving system which consumes less power is desirable. Systems with reliable storage media and longer MTBFs are also desirable. Further, storage systems utilizing cheaper components but maintaining the increased reliability of more expensive counterparts is also desirable. Storage systems which reduce administrative overhead are also desirable.

SUMMARY

It has been realized that less reliable, lower quality storage media have longer mean time before failure (MTBF) if they are not run continuously. It has further been realized that there is a correspondence between the frequency a user accesses particular data (especially the frequency the user updates data, i.e., writes to the memory) and the date the particular data was creation. The more recently the particular data was created, the more likely the user will access or update the particular data more frequently. Conversely, as time passes from its creation date, the more likely the user will leave the particular data unaltered or just read it. It has further been realized that less reliable, lower quality storage media have a greater risk of failure as they fill up. Although these benefits have been noted, it will be appreciated that an infringing embodiment need not realize any of these benefits.

One embodiment of the invention includes a data storage system. The data storage system includes a first data storage medium for storing data, the first data storage medium currently configured as an accessible medium; a second data storage medium for storing a copy of the data, the second data storage medium currently configured as a standby medium; first configuration information defining a switching trigger when the first data storage medium currently configured as the accessible medium becomes the standby medium and when the second data storage medium currently configured as the standby medium becomes the accessible medium; and a data storage system manager using the first configuration information to control the switching.

The first data storage medium and second data storage medium may each be in a power-saving state. The accessible medium thus may be in a power-saving mode. The standby medium thus may be in a power-saving mode or in a power-off mode. The accessible medium may be read-only. The switching trigger may be a time period, an equation of access time or an administrative request. There data storage system may include additional data storage media for storing additional copies of the data, the additional data storage media also configured as standby media.

Another embodiment of the invention includes a method of storing data. The method includes configuring a first data storage medium for storing data as an accessible medium; configuring a second storage medium for storing a copy of the data as a standby medium; identifying a switching trigger when the first storage medium currently configured as the accessible medium becomes the standby medium and the second storage medium currently configured as the standby medium becomes the accessible medium; and switching the accessible medium and the standby medium after the switching trigger is identified.

Yet another embodiment of the invention includes a data storage system. The data storage system includes a data storage medium having a total capacity and having an active state and a power-saving state; and a data storage system manager for maintaining the data storage medium in the active state when the data storage medium stores data less than a threshold capacity and for switching the data storage medium to the power-saving state after the data storage medium stores data at least equal to the threshold capacity.

The data storage medium may be in a power-on mode when in the active state. The power-on mode may enable read and write access. The data storage medium may use a low-power mode when in the power-saving state. The low-power mode may enable read-only access or read and write access. The data storage system manager may switch the data storage medium back to active mode after identifying a trigger event. The trigger event may include receiving a write request or administrative request. The threshold capacity may be completely full or less than completely full. The data storage system manager may switch the storage medium to the power-saving state as soon as the threshold capacity is reached, after a period of time after the threshold capacity is reached, or after the threshold capacity is reached and there is a reduction in the frequency of access requests.

Still another embodiment includes a method for storing data. The method includes providing a data storage medium having a total capacity and having an active state and a power-saving state; maintaining the data storage medium in the active state when the data storage medium stores data less than a threshold capacity; and switching the data storage medium to the power-saving state after the data storage medium stores data at least equal to the threshold capacity.

Further, another embodiment includes a data storage system. The data storage system includes a data storage subsystem having a known total capacity; a storage failure module for determining if a portion of the data storage subsystem has failed; and a data storage system manager for modifying the known total capacity of the data storage subsystem based on the failure of the portion and for causing a warning event when the data storage subsystem has reached a threshold capacity of the total capacity as modified.

The data storage subsystem may include only one storage medium or multiple storage media. The portion may include a portion of the storage space in a storage medium or an entire storage medium. The storage failure module includes S.M.A.R.T. technology. The threshold capacity is formed from a percentage of the known total capacity, or specify an amount of storage space. The data storage system manager may modify the known total capacity based on any data storage mediums added to the data storage subsystem, any storage space allocation changes, and/or any restoration of failed portions.

Still further, another embodiment of the invention includes a method for storing data. The method includes determining if a portion of a data storage subsystem having a known total capacity has failed; modifying the known total capacity of the data storage subsystem based on the failure of the portion; and causing a warning event when the data storage subsystem has reached a threshold capacity of the total capacity as modified.

Also, an embodiment of the invention includes a data storage system. The data storage system includes a data storage subsystem having at least one active data storage medium and at least one spare data storage medium; a data storage failure module for determining if a data storage medium in the data storage subsystem has failed; a spare medium substitution module for substituting the spare medium for a failed data storage medium; and a data storage system manager for modifying the total number of spare media in the data storage subsystem based on any substitutions and for causing a warning event when the data storage subsystem has reached a threshold number of the spare media. The data storage system manager may also modify the total number of spare media in the data storage subsystem based on any additions.

BRIEF DESCRIPTION OF THE DRAWINGS

FIG. 1 is a block diagram of the basic configuration of an archiving storage system in accordance with an embodiment of the present invention.

FIG. 2 is a block diagram of the basic configuration of an archive storage system in accordance with another embodiment of the present invention.

FIG. 3 is a block diagram of the archive storage system of FIG. 1 in operation.

FIG. 4 is a table illustrating details of the configuration information of FIG. 1.

FIG. 5 is a table illustrating details of the state table of FIG. 1 or FIG. 4.

FIG. 6 is a state transition diagram.

FIG. 7 is block diagram of the archive storage system of FIG. 1 or FIG. 4 conducting self-repair.

FIG. 8 is a graph illustrating threshold management analysis.

FIG. 9 is a block diagram illustrating role reversal of disks.

DETAILED DESCRIPTION

It has been realized that less reliable, lower quality storage media have longer mean time before failure (MTBF) if they are not run continuously. It has further been realized that there is a correspondence between the frequency a user accesses particular data (especially the frequency the user updates data, i.e., writes to the memory) and the date the particular data was creation. The more recently the particular data was created, the more likely the user will access or update the particular data more frequently. Conversely, as time passes from its creation date, the more likely the user will leave the particular data unaltered or just read it. It has further been realized that less reliable, lower quality storage media have a greater risk of failure as they fill up. Although these benefits have been noted, it will be appreciated that an infringing embodiment need not realize any of these benefits.

FIG. 1 is a block diagram of the basic configuration of an archiving storage system network 1000 in accordance with an embodiment of the present invention. Network 1000 includes a host 1010 coupled via a data transmission line 1040, e.g., fibre channel, to an archive storage subsystem 1060. In this embodiment, the host 1010 includes an archive manager 1020 that manages the archive storage subsystems 1060, although in other embodiments the archive manager 1020 can be located elsewhere. For example, as shown in FIG. 2, the archive manager 1020 can be stored in the archive storage subsystem 1060. The archive manager 1020 is preferably made of software.

The archive storage subsystem 1060 includes at least one data storage medium 1080. Although the teachings herein may be applied to single storage medium systems, the example embodiments of the archive storage subsystem 1060 illustrated herein include several RAID1 groups 1070 and spare media 1110. Each RAID1 group 1070 includes an accessible storage medium 1080 and a standby storage medium 1090. To reduce cost, each storage medium 1080 and 1090 preferably comprises an inexpensive magnetic disk. Although each RAID1 group 1070 is illustrated as including two disks, one skilled in the art will recognize that each RAID1 group 1070 could include two or more disks. Although each storage medium 1080 and 1090 in each RAID1 group 1070 stores the same data, the accessible storage medium 1080 is controlled to be accessible to user read requests and possibly to user write requests. The standby storage medium 1090 is controlled to act as a backup storage device, not accessible by user requests. Thus, should an accessible storage medium 1080 fail, the standby storage medium 1090 can become the accessible storage medium 1080, thereby preventing downtime of the archive storage subsystem 1060.

The archive manager 1020 includes configuration information 1100 and a state table 1030. Generally, the configuration information 1100 configures the archive storage subsystem 1060, as described in greater detail with regard to FIG. 4. Generally, the state table 1030 defines the states of each storage medium 1080 or 1090 of each RAID1 group 1070 of the archive storage subsystem 1060, as described in greater detail with regard to FIG. 5. Using the configuration information 1100 and the state table 1030, the archive manager 1020 manages the RAID1 groups 1070 of the archive storage subsystem 1060, and controls the RAID1 Groups' 1070 states. One skilled in the art will recognize that the variables and values of the configuration information 1100 and state table 1030 are merely examples.

Based on the operational state (described below) of each RAID1 group 1070 (and on values stored in configuration information 1100 and state table 1030), the archive manager 1020 defines the power mode (e.g., power-on mode, power-saving mode, power-off mode) of each RAID1 group 1070. Power-on mode consumes normal power and enables the RAID1 group 1070 to read and write. Power-saving mode (or low power mode) consumes less power than power-on mode, but may enable read-only access to the RAID1 group 1070. Power-saving mode realizes a longer life of a storage medium and curtailment of power consumption.

The operational state of each RAID1 group 1070 can be, for example, active, power-saving or waiting. An active storage medium (in the active state) is ready for reading and writing archive data. It will be appreciated that the archive storage subsystem 1060 is most efficient when only one RAID1 group 1070 is active. When a storage medium 1080 or 1090 switches to the power-saving state, the storage medium switches to power-saving mode, e.g., by reducing the number of revolutions per minute and possibly enabling read-only access. A data storage medium 1080 or 1090 may switch to the power-saving state after the RAID1 group 1070 has filled to a predetermined threshold (which could be a completely full threshold), after a reduction in the frequency a user accesses the data, after the RAID1 group 1070 has filled to a predetermined threshold and a predetermined time period has elapsed (indicating that the likelihood is that the data will only be read and not updated), by manual operation, or by other trigger meriting power saving. Lastly, the waiting state indicates that the RAID1 group 1070 stores no data, and is ready to be activated when the RAID1 group 1070 currently active and being accessed switches to power-saving state, e.g., fills up to the threshold capacity. Each RAID1 group 1070 in the waiting state is preferably in power-saving mode or in power-off mode.

To reduce the mean time before failure (MTBF), the archive manager 1020 modifies the configuration information 1100 and/or state table 1030 to switch the accessible storage medium 1080 and the standby storage medium 1090, thereby rendering the currently accessible storage medium 1080 as the now standby storage medium 1090 and the currently standby storage medium 1090 as the now accessible storage medium 1080. Since it has been found that continuously using the same inexpensive storage medium for long periods of time causes greater risk of failure, this role switching (or role reversal) technique reduces continuity of operations and thus reduces risk of failure. Typically, role switching is caused by a trigger, e.g., a passage of a set time period (e.g., a week), administrative request (e.g., via a user command), an equation of access time (e.g., 1000 minutes of access), or any other trigger. Role switching may be implemented for active RAID1 groups 1070, for RAID1 groups 1070 in power saving mode, for either or both RAID1 groups 1070, or for any other RAID1 groups 1070.

To aid in the management of disk failures of each RAID1 group 1070, the archive storage subsystem 1060 and archive manager 1020 may implement S.M.A.R.T. or other disk evaluation tool. As stated in the background above, S.M.A.R.T. enables a disk to self-evaluate and inform an administrator of disk failure. When the archive manager 1020 receives a warning from a disk drive 1080 or 1090, the archive manager 1020 can replace the corrupted or soon-to-be corrupted disk with a spare disk 1110 and stop the corrupted disk. However, the archive manager 1020 need not inform the system administrator of the failure. Instead, the archive manager 1020 modifies the amount of disk space available, as described in greater detail with reference to FIG. 8. More specifically, when a disk failure is noted, the archive manager 1020 dissolves the link between the accessible medium 1080 and the standby medium 1090 in the RAID1 group 1070 and then regroups the storage medium still operational with one of the spare media 1110. All data is copied from the operational medium 1080 or 1090 to the spare medium 1110, and configurations set. Replacing a corrupted data storage medium 1080 or 1090 with a spare data storage medium 1110 is described in greater detail with reference to FIG. 7.

In FIG. 3, an embodiment of network 1000 is shown mid-operation, identifying the operational state and power mode of each RAID1 group 1070. Archived data is typically written into RAID1 groups 1070 in order of group 1070a, group 1070b and group 1070c. Since the first RAID1 group 1070, i.e., RAID1 group 1070a, has been filled with data, it has been changed to the power-saving state. The second RAID1 group 1070, i.e., RAID1 group 1070b, is still not full and thus in the active state. The third RAID1 group 1070, i.e., RAID1 group 1070c, is in the waiting state. Similarly, spare media 1110, e.g., spare media 1110a, is in a spare state.

According to the above states, the configuration information 1100 and the state table 1030, accessible disk 1080a in RAID1 group 1070a is powered on and in power-saving mode (read-only). Thus, in this embodiment, users can only read from the accessible disk 1080a. Accessible disk 1080b in RAID1 group 1070b is power-on mode (read/write). Users can read from and write to disk 1080b. Accessible disk 1080c in RAID1 group 1070c is powered off. Users cannot access this disk 1080c until it switches to the active state.

According to the above states, the configuration information 1100 and the state table 1030, standby disk 1090a in RAID1 group 1070a is powered off. Accordingly, since users can only read from accessible disk 1070a, there is no danger of compromising data coherency. Standby disk 1090b in RAID1 group 1070b is powered on. Accordingly, as data is written to accessible disk 1080b, the same data is written to standby disk 1090b at the same time. Standby disk 1090c in RAID1 group 1070c is powered off.

FIG. 4 shows configuration information 1100, for convenience illustrated as a table. Although shown as a table, one skilled in the art will recognize that alternative structures can be used. As a table, configuration information 1100 includes several rows. Each row specifies a configuration variable. Column 3070 specifies the default values of the variables. Column 3080 specifies the ranges of possible values of the variables.

Row 3010 specifies the number of disks in each RAID1 group 1070. The setting range 3080 specifies that this number must be less than or equal to the total number of disks. The default 3070 is two disks per RAID1 group 1070.

Row 3020 specifies the number of accessible disks 1080 in each RAID1 group 1070. The setting range 3080 specifies that this number must be less than or equal to the number of disks in each RAID1 group 1070. The default 3070 is one accessible disk per RAID1 group 1070.

Row 3030 specifies the power status of each accessible disk 1080 in a RAID1 group 1070 in the power-saving state. The setting range 3080 specifies that this value can be one of power-on, saving mode or power-off. The default 3070 is power-on. It may be unnecessary to specify the power status of each accessible disk 1080 in a RAID1 group 1070 in the active state, since the accessible disk 1080 should be on so that it can write information.

Row 3120 specifies the power status of each standby disk 1090 when in the power-saving state. The setting range 3080 specifies that this value can be one of power-on, saving mode or power-off. The default 3070 is power-off. Again, it may be unnecessary to specify the power status of each standby disk 1090 in a RAID1 group 1070 in the active state, since the standby disk 1090 should be on so that it can write information.

Row 3040 specifies the power status of each waiting disk (e.g., disks 1070c). The setting range 3080 specifies that this value can be one of power-on, saving mode or power-off. The default 3070 is power-off, since users need not access waiting disks.

Row 3050 specifies the trigger of role reversal (role switching). As stated above, the accessible disk 1080 switches to the standby disk 1090 and the standby disk 1090 switches to the accessible disk 1080 at this trigger. The setting range 3080 may be based on time or on an equation of access time. The time value identifies a preset time, e.g., one week, after which role reversal is triggered. The "equation of access time" value computes the total time of all accesses handled by the currently accessible disk 1080. The default 3070 is one week time.

Row 3060 specifies the threshold of maintenance warning. This threshold specifies when the archive manager 1020 should inform an administrator of a potentially hazardous condition. The setting range 3080 specifies that the value can be a certain percentage of the total capacity of the archive storage subsystem 1060 or a certain amount of data (e.g., number of gigabytes). The default 3070 is 70% of total used space.

Row 3090 specifies the number of spare disks 1110 in the archive storage subsystem 1060. The setting range 3080 specifies that the value may be less than or equal to half the number of disks in the archive storage subsystem 1060. The default 3070 is 10% of the number of total disks in the storage subsystem 1060.

Row 3100 specifies the time of mode switching. The time of mode switching specifies the time when active drives, e.g., drives 1070b, automatically switch to power-saving drives, e.g., drives 1070a. This value may indicate a time period since the last access, a time period since the data storage medium 1070b has reached its threshold capacity, a time period since the last access after the data storage medium 1070b has reached its threshold capacity, or the like. The setting range 3080 specifies the possible values for this variable, namely, hour, day, week, month, etc. The default 3070 value is one week.

Row 3110 specifies whether the data storage medium 1070 can return to read/write status after a data storage medium 1070 becomes a read-only drive, e.g., data storage medium 1070a. The setting range 3080 specifies that this value may be yes or no. The default 3070 is no.

FIG. 5 is a table illustrating details of state table 1030. Although shown as a table, one skilled in the art will recognize that alternative structures can be used, that the configuration information and state table 1030 could be combined into a single structure or be divided into multiple structures in different groupings, and that state table 1030 includes configuration information for configuring the archive storage subsystem 1060 like configuration information 1100.

As a table, state table 1030 includes several rows. Each row of state table 1030 specifies a state variable. Columns 2090 specify the values for each disk in each group 1070. Column 2095 specifies the total values for certain variables for the archive storage subsystem 1060 as a single unit. For convenience, disk00 represents storage medium 1080a (power-saving state, accessible disk), disk01 represents storage medium 1090a (power saving state, standby disk), disk02 represents storage medium 1080b (active state, accessible disk), disk03 represents storage medium 1090b (active state, standby disk), disk04 represents storage medium 1080c (waiting state), and disk05 represents storage medium 1090c (waiting state). It will be appreciated that the archive manager 1020 controls the values of state table 1030.

Row 2010 specifies the power status of each disk. Possible setting ranges include power-on, power-off and power-saving. Disk00 is powered on (as the accessible disk in the power saving state), disk01 is powered off (as the standby disk in the power saving state), disk02 is powered on (as the accessible disk in the active state), disk 03 is powered on (as the standby disk in the active state), disk04 is powered off (as a waiting disk in the waiting state), and disk05 is powered off (as a waiting disk in the waiting state).

Row 2020 specifies the current disk condition. Possible setting ranges include good, warning and corrupted. Disk00, disk01, disk02, disk03, disk04 and disk05 are each good.

Row 2030 specifies the RAID1 group number that identifies to which RAID1 group 1070 the particular disk belongs. Disk00 belongs to group 0000 (e.g., group 1070a). Disk01 belongs to group 0000 (e.g., group 1070a). Disk02 belongs to group 0001 (e.g., group 1070b). Disk03 belongs to group 0001 (e.g., group 1070b). Disk04 belongs to group 0002 (e.g., group 1070c). And, disk05 belongs to group 0002 (e.g., group 1070c).

Row 2040 specifies the operational state of each RAID1 group 1070. Setting ranges include active, waiting and power-saving. Disk00 and disk01 are in the power-saving state. Disk02 and disk03 are in the active state. Disk04 and disk05 are in the waiting state.

Row 2050 specifies attributes of each RAID1 group 1070. Setting ranges include read-only, no I/O and read/write. Disk00 and disk01 are read-only. Disk02 and disk03 are read/write. And, disk04 and disk05 accept no I/O.

Row 2060 specifies the used space of each RAID1 group 1070. In this example, the setting range specifies a number in gigabytes. Disk00 and disk01 have 320 GB of used space. Disk02 and disk03 have 20 GB of used space. And, disk04 and disk05 have 0 GB of used space.

Row 2070 specifies the available space of each RAID1 group 1070. In this example, the setting range specifies a number in gigabytes. Disk00 and disk01 have 0 GB available. Disk02 and disk 03 have 300 GB available. And, disk04 and disk05 have 320 GB available.

Row 2080 specifies total RAID1 size of each RAID1 group 1070. In this example, the setting range specifies a number in gigabytes. Disk00, disk01, disk02, disk 03, disk04, and disk05 each have 320 GB capacity.

Entry 2130 specifies the total number of spare disks 1110 in the archive storage subsystem 1060. In this example, the total is two. This number will change as corrupted disks are replaced with spare disks 1110.

Entry 2100 specifies the total space used on the archive storage subsystem 1060 as a single unit. In this example, the total used space is 340 GB.

Entry 2110 specifies the total space available in the archive storage subsystem 1060 as a single unit. In this example, there is 620 GB remaining available.

Entry 2120 specifies the total disk size of the archive storage subsystem 1060 as a single unit. In this example, the total size is 960 GB.

FIG. 6 shows a state transition diagram (default) illustrating a states of each data storage medium 1080 or 1090 in operation. Each data storage medium 1080 or 1090 begins in the initial state 4010, un-initialized. During initialization, the disk is formatted and assigned to a RAID1 group 1070.

After being assigned to a group 1070, the disk state changes to a waiting state 4020. While waiting, the disk accepts no I/O. In this embodiment, this waiting disk is shown in power-off mode, although as an alternative it may be in power-saving mode.

When the disk receives a write request, the state of the waiting disk changes to the active state 4030. While active, the storage medium 1080 or 1090 accepts read and write requests. All disks in active status 4030 are in power-on mode.

If the "time of mode switching" so indicates, e.g., if the disk space reaches its threshold, an administrator switches the status from read/write to read-only, or any other power-saving mode request is received, the active disk state changes to the power-saving state 4100. In this embodiment, all disks in the power-saving state 4100 are read-only. Accessible and standby disks in the power-saving state 4100 may role switch. After a role switching trigger is received, e.g., after the lapse of one week, the accessible disk 4040 switches to be the standby disk 4050 and the standby disk 4050 switches to be the accessible disk 4040. If a group 1070 has three or more disks, the archive manager 1020 rotates those disks as shown in FIG. 9. In the power saving state 4100, the accessible disk 4040 is read only and powered on. In the power-saving state 4100, the standby disk 4050 is also read only. The disk is either powered off or in power-saving mode.

If an administrator switches the storage medium 1080 or 1090 to read/write, or the disk in the power-saving state 4100 receives a write request (and is enabled to change to read/write), the disk state returns to the active state 4030, thereby enabling read and write access.

From any state, if the disk fails, the state jumps to corrupted 4070. If corrupted, the disk is powered down to a stop state 4090.

FIGS. 7a, 7b, 7c and 7d are block diagrams illustrating the work flow of failure management and self-repair. In FIG. 7a, the archive manager 1020 monitors the disks 1080, 1090 and 1110. In FIG. 7b, the disk 1090 recognizes a failure (or imminent failure) and informs the archive manager 1020. In FIG. 7c, the archive manager 1020 receives the indication of disk failure, adds spare disk 1110 into the RAID1 group 1070, and copies the data in the RAID1 group 1070 (from the disk still operational) to the spare disk 1110. In FIG. 7d, the archive manager 1020 removes the corrupted disk 1090 from the RAID1 group 1090 and powers it down.

FIG. 8 is a graph illustrating threshold management analysis. If the archive storage subsystem 1060 uses cheap disks, disk failure will likely be common. Accordingly, to decrease administrative costs, threshold management may be used, for example, when changing a corrupted disk with a new disk, when assigning new disk space, when adding a new disk because of a shortage of disk capacity, when only portions of a disk become corrupted, etc.

Generally, the archive storage subsystem 1060 has a total capacity to store only a certain amount of data, and at any given time stores an actual amount of data, hopefully less than the total capacity. The archive manager 1020 is configured to recognize when the actual amount of data reaches some threshold 3060. When the actual amount reaches the threshold 3060, the archive manager 1020 informs the administrator about the necessity for maintenance. The threshold 3060 may be a percentage of total capacity, a number specifying the total storage space still available, the number of spare disks 1110 or some other threshold. Thus, disk failure can translate to a reduction of the total storage space remaining in the entire subsystem 1060. Or, disk failure can translate to a reduction in the number of available spare disks 1110. The archive manager 1020 need only compare the actual value to the threshold 3060 to determine whether to warn the system administrator. The archive manager 1020 need not warn the administrator of each disk failure. Since an administrator need not respond for each disk failure, maintenance costs decrease.

In the graph, total capacity of all disks in subsystem 1060 is shown as line 2110. Each disk failure 6010 causes a decrease in the total capacity available (not to a call to the system administrator). The threshold 3060, in this example as a percentage of the total space available drops an equal percentage with the loss of total capacity available. As the disks fill, the actual space used (as illustrated by line 2100) rises. When the actual space used 2100 crosses the threshold 3060, the archive manager 1020 warns the system administrator.

As stated above, the archive manager 1020 manages the total used space 2100, the total available space 2110 and the threshold 3060.

FIG. 9 is a block diagram illustrating role switching in the case of three disks. In a RAID1 group 1070 having three disks 1080, 1090 (first instance) and 1090 (second instance), the accessible disk 1080 rotates among the three disks at each trigger point. As shown in state 9010, the first disk currently labeled 1080 is the accessible disk. The other two disks are standby disks, each labeled 1090, each storing the same data as disk 1080. After a trigger occurs, e.g., after one week, the accessible disk 1080 switches to another disk. In state 9020, the third disk becomes the accessible disk 1080. The other two disks become standby disks 1090. After another trigger (which may be the same or a different trigger), the accessible disk 1080 switches again. In state 9030, the second disk becomes the accessible disk 1080 and the other two disks become the standby disks 1090. After yet another trigger, the accessible disk 1080 switches back to the original state 9010. One skilled in the art will recognize that other role reversal orders can be selected.

The foregoing description of the preferred embodiments of the present invention is by way of example only, and other variations and modifications of the above-described embodiments and methods are possible in light of the foregoing teaching. For example, a data storage medium may include one disk or multiple disks, and may include disks of one type or multiple types. As another example, the power-saving mode may include sleep modes, power-off with an awake mode, etc. Although the network nodes are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A data storage system, comprising:
   a first data storage medium for storing data, the first data storage medium currently configured as an accessible medium;
   a second data storage medium for storing a copy of the data, the second data storage medium currently configured as a standby medium;
   first configuration information defining a switching trigger when the first data storage medium currently configured as the accessible medium becomes the standby medium and when the second data storage medium currently configured as the standby medium becomes the accessible medium;
   a data storage system manager using the first configuration information to control the switching;
   a storage failure module operable to determine whether at least a portion of the storage system has failed; and
   a manager operable to manage and modify a total storage capacity based on the failure of the portion of the storage system, wherein the manager causes a warning event when the storage system has reached a threshold capacity of the total capacity as modified.

2. The system of claim 1, wherein the first data storage medium and second data storage medium are each in a power-saving state.

3. The system of claim 2, wherein the accessible medium is in a power-saving mode.

4. The system of claim 3, wherein the standby medium is in a power-saving mode.

5. The system of claim 3, whetein the standby medium is in a power-off mode.

6. The system of claim 2, wherein the accessible medium is read-only.

7. The system of claim 1, wherein the switching trigger includes a time period.

8. The system of claim 1, wherein the switching trigger includes an equation of access time.

9. The system of claim 1, wherein the switching trigger includes an administrative request.

10. The system of claim 1, further comprising a third data storage device for storing a copy of the data, the third data storage device currently configured as a standby medium.

11. A method of storing data in a storage system, comprising:
    configuring a first data storage medium for storing data as an accessible medium;
    configuring a second storage medium for storing a copy of the data as a standby medium;
    identifying a switching trigger when the first storage medium currently configured as the accessible medium becomes the standby medium and the second storage medium currently, configured as the standby medium becomes the accessible medium;
    switching the accessible medium and the standby medium after the switching trigger is identified;
    determining whether at least a portion of the storage system has failed;
    modifying a total storage capacity based on the failure of the portion of the storage system; and
    causing a warning event when the storage system has reached a threshold capacity of the total capacity as modified.

12. The method of claim 11, wherein the first data storage medium and second data storage medium are each in a power-saving state.

13. The method of claim 12, wherein the accessible medium is in a power-saving mode.

14. The method of claim 13, wherein the standby medium is in a power-saving mode.

15. The method of claim 13, wherein the standby medium is in a power-off mode.

16. The method of claim 12, wherein the accessible medium is read-only.

17. The method of claim 11, wherein the switching trigger includes a time period.

18. The method of claim 11, wherein the switching trigger includes an equation of access time.

19. The method of claim 11, wherein the switching trigger includes an administrative request.

20. The method of claim 11, further comprising configuring a third data storage medium for storing a copy of the data as a standby medium.

21. A data storage system, comprising:
- a first data storage medium for storing data;
- a second data storage medium for storing a copy of the data;
- means for configuring the first data storage medium as an accessible medium and the second storage medium as a standby medium;
- means for identifying a switching trigger when the first storage medium currently configured as the accessible medium becomes the standby medium and the second storage medium currently configured as the standby medium becomes the accessible medium;
- means for switching the accessible medium and the standby medium after the switching trigger is identified;
- a storage failure module operable to determine whether at least a portion of the data storage system has failed; and
- a manager operable to manage and modify a total storage capacity based on the failure of the portion of the storage system, wherein the manager causes a warning event when the storage system has reached a threshold capacity of the total capacity as modified.

* * * * *